United States Patent
Selbmann et al.

(10) Patent No.: US 10,479,165 B2
(45) Date of Patent: Nov. 19, 2019

(54) METHOD FOR OPERATING A FILLING ADAPTER, AND FILLING ADAPTER FOR FILLING REFRIGERANT R744 INTO VEHICLE AIR CONDITIONING SYSTEMS

(71) Applicant: DÜRR SOMAC GmbH, Stollberg (DE)

(72) Inventors: Eric Selbmann, Gersdorf (DE); Frank Wieland, Burkhardtsdorf (DE); Felix Köhler, Schneeberg (DE)

(73) Assignee: DÜRR SOMAC GmbH, Stollberg (DE)

( * ) Notice: Subject to any disclaimer, the term of this patent is extended or adjusted under 35 U.S.C. 154(b) by 158 days.

(21) Appl. No.: 15/546,414

(22) PCT Filed: Feb. 10, 2016

(86) PCT No.: PCT/DE2016/000051
§ 371 (c)(1),
(2) Date: Oct. 25, 2017

(87) PCT Pub. No.: WO2016/127973
PCT Pub. Date: Aug. 18, 2016

(65) Prior Publication Data
US 2018/0162194 A1    Jun. 14, 2018

(30) Foreign Application Priority Data
Feb. 11, 2015   (DE) ................. 10 2015 001 767

(51) Int. Cl.
*B60H 1/00* (2006.01)
*B67D 7/02* (2010.01)
(Continued)

(52) U.S. Cl.
CPC ..... *B60H 1/00585* (2013.01); *B60H 1/00571* (2013.01); *B67D 7/02* (2013.01);
(Continued)

(58) Field of Classification Search
CPC .. B60H 1/00585; B60H 1/00571; B67D 7/02; B67D 7/06; B67D 7/42; F16L 37/44; F16L 37/62; F16L 55/1022
(Continued)

(56) References Cited

U.S. PATENT DOCUMENTS

| | | | | |
|---|---|---|---|---|
| 4,805,417 A | * | 2/1989 | Weaver | F16L 37/23 137/614 |
| 4,889,149 A | * | 12/1989 | Weaver | B60H 1/00585 137/1 |
| 5,244,010 A | * | 9/1993 | Barjasteh | B60H 1/00585 137/614 |
| 6,298,886 B1 | * | 10/2001 | Robinson | B60H 1/00585 137/614.06 |

(Continued)

OTHER PUBLICATIONS

International Search Report for PCT/DE2016/000051 (in German and English), ISA/EP, Rijswijk, NL, dated Jul. 22, 2016.
(Continued)

*Primary Examiner* — Timothy L Maust
(74) *Attorney, Agent, or Firm* — Harness, Dickey & Pierce, P.L.C.

(57) ABSTRACT

The disclosure relates to a method for operating a filling adapter for filling refrigerant R744 into vehicle air conditioning systems as well as to a corresponding adapter. The adapter comprises mechanical clamping elements actuated by a pneumatically or mechanically controlled clamping piston. The clamping elements are clamped b the clamping system onto specifically designed sections of the vehicle air conditioning system for the filling process and are kept in the clamping position during the filling process. The clamping piston comprises at least two separate piston surfaces to be subjected to the pressure of two different pressurization media, one piston surface being effectively connected to the control pressure of the filling adapter and the other piston surface being effectively connected to the filling pressure of the refrigerant.

6 Claims, 1 Drawing Sheet

(51) Int. Cl.
*B67D 7/06* (2010.01)
*B67D 7/42* (2010.01)
*F16L 55/10* (2006.01)
*F16L 37/44* (2006.01)
*F16L 37/62* (2006.01)
*F25B 45/00* (2006.01)
*F16L 55/00* (2006.01)

(52) U.S. Cl.
CPC .............. *B67D 7/06* (2013.01); *B67D 7/42* (2013.01); *F16L 37/44* (2013.01); *F16L 37/62* (2013.01); *F16L 55/1022* (2013.01); *F16L 55/005* (2013.01); *F25B 45/00* (2013.01); *F25B 2345/006* (2013.01)

(58) Field of Classification Search
USPC ............ 141/82, 346, 347, 383–386; 137/614
See application file for complete search history.

(56) References Cited

U.S. PATENT DOCUMENTS

| | | | | |
|---|---|---|---|---|
| 6,539,970 | B1* | 4/2003 | Knowles | B08B 9/0321 |
| | | | | 137/15.04 |
| 6,776,186 | B2* | 8/2004 | Swinford | B60H 1/00585 |
| | | | | 137/605 |
| 6,837,064 | B2* | 1/2005 | Knowles | F16L 37/23 |
| | | | | 137/614.06 |
| 8,056,581 | B2* | 11/2011 | Danielson | F16L 37/23 |
| | | | | 137/614 |
| 10,328,767 | B2* | 6/2019 | Wohner | F16L 37/23 |
| 2003/0226598 | A1 | 12/2003 | Swinford | |
| 2017/0217281 | A1* | 8/2017 | Achatz | F25B 45/00 |

OTHER PUBLICATIONS

Written Opinion of the ISA for PCT/DE2016/000051 (in German), ISA/EP, Rijswijk, NL, dated Jul. 22, 2016.

* cited by examiner

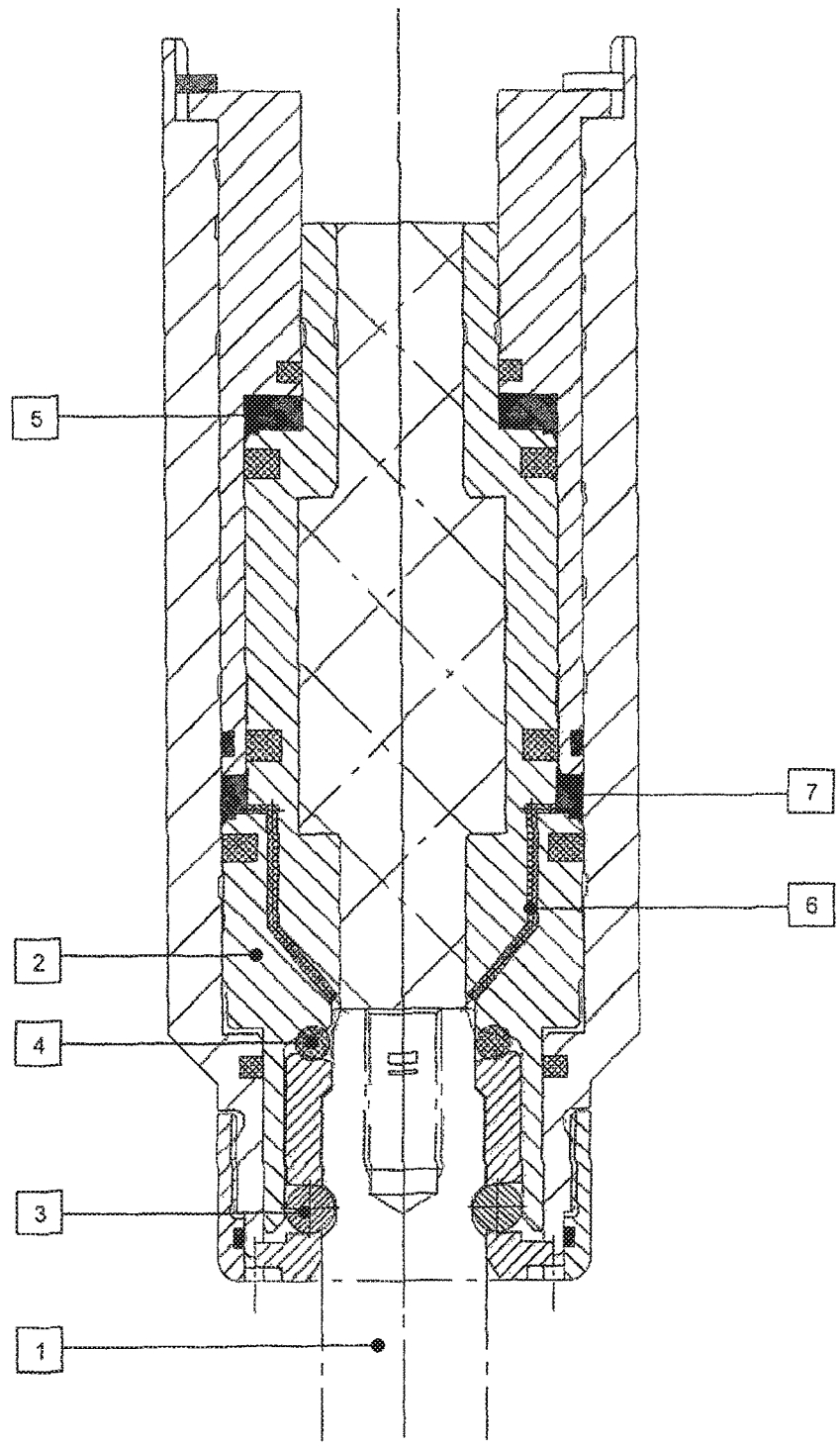

METHOD FOR OPERATING A FILLING ADAPTER, AND FILLING ADAPTER FOR FILLING REFRIGERANT R744 INTO VEHICLE AIR CONDITIONING SYSTEMS

CROSS-REFERENCE TO RELATED APPLICATIONS

This application is a 371 U.S. National Stage of International Application No. PCT/DE2016/000051, filed Feb. 10, 2016, which claims the benefit of German Patent Application No. 10 2015 001 767.5, filed Feb. 11, 2015. The disclosures of the above applications are incorporated herein by reference.

FIELD

The invention relates to a method for operating a filling adapter for filling vehicle air conditioning systems with refrigerant R744 and a respective filling adapter. The filling adapter includes mechanical clamping elements that are operated by means of a pneumatically or mechanically controlled clamping piston. The clamping elements are tightened by the clamping piston for the filling process onto specifically designed portions of the vehicle air conditioning system and held in the clamped position during the filling process.

BACKGROUND AND SUMMARY

Filling adapters for filling vehicle are predominantly designed such that they are clamped onto specifically designed component portions of the vehicle air conditioning system by means of mechanical clamping elements which are operated by means of a pneumatically or mechanically controlled clamping piston. The mechanical clamping elements, which are particularly designed as clamping claws or balls, are kept in the clamped position by the clamping piston. If the control function fails during the filling process or if the clamping piston exercises the control function incorrectly, this will not just impair the filling process but also drop the filling adapter from the respective vehicle interface. Such a drop will be additionally accelerated by the kinetic energy from the filling system.

Based on legal requirements, vehicle air conditioning systems increasingly use refrigerants that meet environmentally friendly requirements. This includes $CO_2$, which as a refrigerant is named R744. Filling with refrigerant R744 is performed at typical pressures between 80 bar and 120 bar. At these pressures, secure clamping of the filling adapter during the filling process is an essential safety requirement to protect the workers in the surrounding area. At the typically high pressure range mentioned, a very great counterforce occurs which must be absorbed by the adapter clamping system. If this is not ensured, there may be leaks in the filling process or even complete loss of the adapter clamping, which is a high safety risk for a worker who operates the filling system or performs operations in the engine compartment of the vehicle to be filled.

Such risks for workers can be reduced or largely be avoided by designing the clamping system to be safe with respect to the system pressure. There is the option to lock the clamping piston in its clamped position (locking) and to monitor the locking element with a sensor. But this has an adverse influence on the size and weight of the clamping system. It should be noted in this respect that the worker who operates the system frequently transports and adapts the filling adapter between the filling system and the vehicle (often after 80 seconds, respectively). A bigger size of the filling system due to a clamping piston locking unit and/or a clamping piston monitoring unit will have a negative impact on ergonomics and work load and also exerts strain on the vehicle ports. This is a considerable disadvantage or even an exclusion criterion for these solutions. The technical complexity of the control system inevitably increases as well.

It is the problem of the invention to create a technical solution with which the locking mechanism of a mechanical clamping system can be durably locked for filling with refrigerant R744 in case the filling valve or the vehicle valve are not closed or if the control pressure drops below a predetermined value.

This problem is solved by applying two different pressure media to the clamping piston, wherein initially the control pressure of the filling adapter is applied, followed by the additional application of the refrigerant filling pressure. A filling adapter is suitable for this in which the clamping piston comprises at least two separate piston surfaces for pressure application by different pressure media, wherein the one piston surface is brought into an operative connection with the control pressure of the filling adapter and the other piston surface is brought into an operative connection with the filling pressure of the refrigerant. Advantageous embodiments are the subject matter of respective dependent claims, whose technical features will be explained in more detail based on an exemplary embodiment.

The technical solution of the invention makes it possible to improve aspects of operator safety and at the same time provide improved functional reliability of a clamping system for filling vehicle air conditioning systems. The clamping system modified accordingly first allows risk-free and safe connecting to the vehicle system and then safe filling at pressures characteristic of the refrigerant R744.

The clamping principle is executed such that the clamping piston is additionally tightened using the pressure of the refrigerant R744 as the filling medium. It only becomes possible to loosen the clamping system and disconnect it from the vehicle system if the system pressure falls below a limit that is non-critical for the safety of the system operator.

The clamping system can thus be designed such that the volume and therefore the weight of the entire filling adapter are kept low due to the combined application of system pressure and filling pressure. This means that the vehicle ports suffer little mechanical strain and acceptable handling of the system by the worker is achieved.

DRAWINGS

An exemplary embodiment is described below with reference to the drawing.

FIG. 1 shows a schematic view of a filling adapter for filling vehicle air conditioning systems with refrigerant R744.

DETAILED DESCRIPTION

FIG. 1 shows a schematic view of a filling adapter for filling vehicle air conditioning systems with refrigerant R744. This filling adapter comprises multiple balls 3 as mechanical clamping elements, which are clamped onto specifically designed portions of the vehicle air conditioning system and kept in a clamped position during the filling process by means of a clamping piston 2, which is preferably pneumatically or mechanically controlled. This design with a service port 1 to connect to the vehicle system, a seal 4 towards the vehicle system, and other components is generally known, such that we will only explain those components in detail below that are relevant for the matter at hand.

Accordingly, the clamping piston 2 comprises two separate piston surfaces 5 and 7 for applying pressure thereto by different pressure media. The one piston surface 5 is brought into an operative connection with the control pressure of the filling adapter, and the other piston surface 7 is brought into an operative connection with the filling pressure of the refrigerant R744.

The two piston surfaces 5, 7 are preferably configured as a circumferential annular surface at cross sectional transitions on the contour of the clamping piston 2. The detailed spatial arrangement is largely freely selectable. It should just be paid attention to a functionally flawless interaction of the associated connecting ducts or the like for the respective pressure medium with the piston surfaces 5, 7.

At least one bypass line 6 branches off to the refrigerant supply from the piston surface 7 that is in operative connection with the filling pressure of the refrigerant. Control compressed air of about ten bar is applied to the other piston surface 5, which is in an operative connection with the control pressure of the filling adapter.

Such a design allows application of two different pressure media to the clamping piston 2. First, the control pressure of the filling adapter is applied to the piston surface 5, then the filling pressure of the refrigerant is applied to the piston surface 7.

This has the functional effect that the control pressure of the filling adapter causes basic locking of the clamping piston 2 at a first clamping pressure. Furthermore, the filling pressure of the refrigerant causes an independent second locking of the clamping piston 2 at a different second clamping pressure. It should expressly be pointed out that an increase in the pressure acting on the clamping piston 2 is not the primary goal. Instead, pressure is applied by the control pressure and the filling pressure, that is, by two different pressure sources. This ensures that the clamping piston 2 is kept fixed in its clamped position, even if one of the two pressure components drops or fails, e.g. due to not properly closed filling valve or vehicle valve. This is a considerable advantage over the filling adapters of prior art.

Unlocking the mechanical clamping elements 3 only becomes possible after the filling pressure of the refrigerant has been reduced to a value that can be defined depending on the device used and the clamping piston can therefore be moved from its clamped position.

The invention claimed is:

1. A method for operating a filling adapter for filling vehicle air conditioning systems with refrigerant R744, wherein the filling adapter comprises mechanical clamping elements which are operated by a pneumatically or mechanically controlled clamping piston, wherein the clamping elements are tightened by the clamping piston for the filling process onto specifically designed portions of the vehicle air conditioning system and held in the clamped position during the filling process, wherein two different pressure media are applied to the clamping piston, wherein initially the control pressure of the filling adapter is applied, followed by the additional application of filling pressure of the refrigerant.

2. The method according to claim 1, wherein the control pressure of the filling adapter causes basic locking of the clamping piston at a first clamping pressure and the filling pressure of the refrigerant causes an independent second locking of the clamping piston at a different second clamping pressure, wherein unlocking of the mechanical clamping elements only becomes possible after the filling pressure of the refrigerant has been reduced to a value that can be defined depending on the device used.

3. A method for filling an automobile air conditioning system with R744 refrigerant under pressure through a service port of the air conditioning system, the method comprising:
   providing a filling adapter for attaching to the service port of the air conditioning system comprising a fluid path therethrough and a clamping element comprising a first piston surface and a second piston surface;
   bringing the filling adapter into operative connection with the service port;
   applying a control pressure to the first piston surface of the clamping element of the filling adapter and urging the clamping element to fixedly engage the service port of the air conditioning system under a first clamping force;
   introducing the R744 refrigerant to the automobile air conditioning system through the filling adapter under a filling pressure; and
   directing a portion of the R744 refrigerant from an outlet of the fluid path of the filling adapter through the clamping element and to the second piston surface of the clamping element of the filling adapter and urging the clamping element to fixedly engage the service port of the air conditioning system under a second clamping force.

4. The method according to claim 3, wherein the first clamping force provides a first locking feature for the filling adapter to the service port;
   wherein the second clamping force provides second locking feature for the adapter to the service port; and
   wherein the second locking feature is operable to maintain the filling adapter in fixed engagement with the service port independent of the first locking feature.

5. The method according to claim 4, wherein control pressure is applied by compressed air.

6. The method according to claim 4, wherein the control pressure is about 10 bar and the filling pressure is between about 80 bar to about 120 bar.

* * * * *